(12) United States Patent
Hoshino

(10) Patent No.: US 7,828,201 B2
(45) Date of Patent: Nov. 9, 2010

(54) BAR-CODE READING APPARATUS, BAR-CODE READING METHOD, AND LIBRARY APPARATUS

(75) Inventor: Keisuke Hoshino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/419,785

(22) Filed: May 23, 2006

(65) Prior Publication Data
US 2007/0199997 A1 Aug. 30, 2007

(30) Foreign Application Priority Data
Feb. 24, 2006 (JP) .............................. 2006-048419

(51) Int. Cl.
*G06K 7/10* (2006.01)
(52) U.S. Cl. ................ 235/45; 235/472.01; 235/462.01
(58) Field of Classification Search .................. 235/45, 235/462.45, 462.46, 472.01, 472.02, 381, 235/385; 369/24.01, 36.01
See application file for complete search history.

(56) References Cited

U.S. PATENT DOCUMENTS

| | | | | |
|---|---|---|---|---|
| 4,939,356 | A * | 7/1990 | Rando et al. .............. | 235/462.2 |
| 5,198,650 | A * | 3/1993 | Wike, Jr. ................ | 235/462.45 |
| 5,661,287 | A | 8/1997 | Schaefer et al. | |
| 5,729,464 | A | 3/1998 | Dimitri | |
| 5,864,130 | A * | 1/1999 | Kahn et al. ............ | 235/462.01 |
| 6,085,975 | A | 7/2000 | Irvine et al. | |
| 6,246,642 | B1 * | 6/2001 | Gardner et al. .......... | 369/30.42 |
| 6,595,417 | B2 * | 7/2003 | O'Hagan et al. ............. | 235/383 |
| 6,758,393 | B1 * | 7/2004 | Luciano et al. ............. | 235/379 |
| 7,093,757 | B2 * | 8/2006 | Boucher et al. ........ | 235/462.01 |
| 7,349,175 | B2 * | 3/2008 | McIntosh et al. .............. | 360/91 |
| 2002/0145034 | A1 | 10/2002 | Shimada et al. .............. | 235/375 |
| 2002/0145949 | A1 | 10/2002 | Gardner, Jr. et al. ....... | 369/30.7 |
| 2007/0127153 | A1 * | 6/2007 | Thorn et al. .................. | 360/92 |

(Continued)

FOREIGN PATENT DOCUMENTS

CN 1155125 A 7/1997

(Continued)

OTHER PUBLICATIONS

Korean Patent Office Notice of Allowance, mailed Jul. 18, 2007 and issued in corresponding Korean Patent Application No. 10-2006-0048544.

(Continued)

*Primary Examiner*—Thien M Le
(74) *Attorney, Agent, or Firm*—Staas & Halsey, LLP

(57) ABSTRACT

The present invention relates to bar-code reading from a carried object such as a cartridge and enables the bar-code reading from a gripped carried object. For a bar-code label attached to a carried object such as a cartridge storing a magnetic tape, a bar-code reading unit is provided in a hand unit, which grips the carried object, at a surface opposite to the carried object; the bar-code reading unit includes a light source (light emitting device) that emits light to the bar-code label and a light receiving unit (light receiving device) that receives reflected light from the bar-code label; the bar-code label is detected by scanning with the light; and therefore, the gripping of the carrier object can be performed concurrently with the reading of the bar-code label.

16 Claims, 15 Drawing Sheets

U.S. PATENT DOCUMENTS

2008/0273261 A1* 11/2008 McIntosh et al. .......... 360/92.1

FOREIGN PATENT DOCUMENTS

| JP | 3-171248 | 7/1991 |
| JP | 9-91930 | 4/1997 |
| JP | 2001-007994 | 1/2001 |
| JP | 2001-331991 | 11/2001 |
| JP | 2005-338938 | 12/2005 |
| WO | WO01/039186 | 5/2001 |

OTHER PUBLICATIONS

Chinese Office Action issued Oct. 16, 2009 in corresponding Chinese Patent Application 200610092272.4.

Japanese Office Action issued on Oct. 21, 2008 in corresponding Japanese Application No. 2006-048419.

* cited by examiner

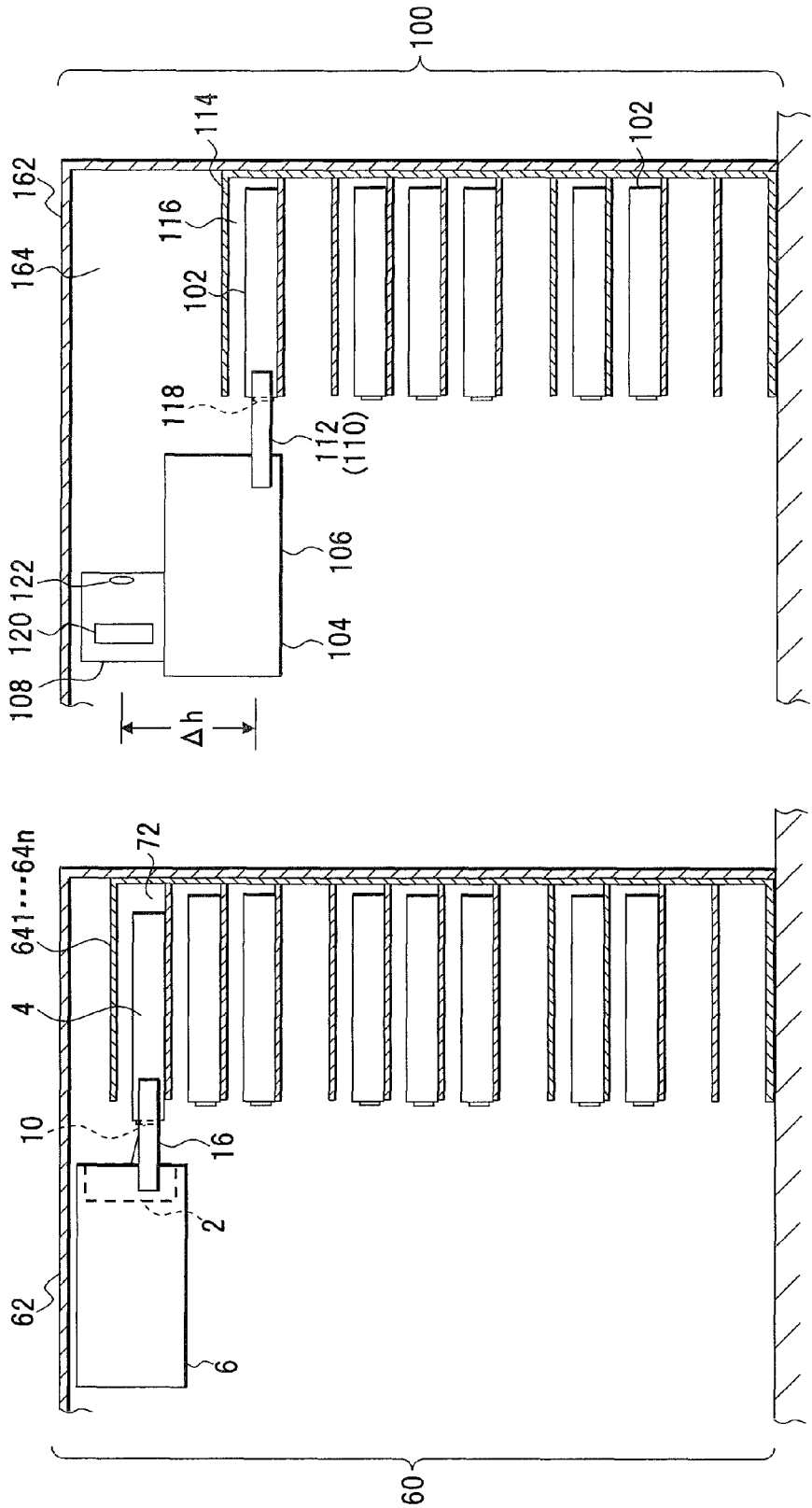

BAR-CODE READING APPARATUS, BAR-CODE READING METHOD, AND LIBRARY APPARATUS

CROSS-REFERENCE TO RELATED APPLICATIONS

This application is based upon and claims the benefit of priority from the prior Japanese Patent Application No. 2006-48419, filed on Feb. 24, 2006, the entire contents of which are incorporated herein by reference.

BACKGROUND OF THE INVENTION

1. Field of the Invention

The present invention relates to a bar-code reading apparatus that reads a bar-code label is attached to a magnetic tape cartridge (hereinafter, simply "cartridge"), etc. and, particularly, relates to a bar-code reading apparatus, bar-code reading method, bar-code reading program, and library apparatus that read a bar-code with reflected light from the bar-code label.

2. Description of the Related Art

On a cartridge that stores a magnetic tape used for writing or reading various data, a bar-code label used for a volume identifier. A library apparatus stores the cartridge in a cell and is provided with a magnetic tape drive apparatus that reads/writes data from/to the magnetic tape and a robot mechanism unit that carries the cartridge between the cell and the magnetic tape drive apparatus as well as a controller that controls functioning units such as the robot mechanism unit and the magnetic tape drive apparatus, and the robot mechanism unit is provided with a bar-code reader that reads the bar-code label from the cartridge. Volume information read by the bar-code reader is used for identifying the cartridge, etc. The known bar-code reader includes a laser type using a polygon mirror, a laser source, etc. and a CCD type combining a lens and a CCD (Charged Coupled Device) device.

With regard to such bar-code reading, in disclosure of Japanese Patent Application Laid-Open Publication No. 1991-171248 (right column of page 1, from line 12, etc.), a light emitting device and a light receiving device are provided in a case of a card-type electronic device and a bar-code is read by illuminating a bar-code with light of the light emitting device and receiving the reflected light with the light receiving device. In disclosure of Japanese Patent Application Laid-Open Publication No. 1997-91930 (paragraph No. 0021, FIG. 3, etc.), a library apparatus reads a bar-code with reflected light from a bar-code label of a recording medium in a cell.

By the way, a bar-code reader using a polygon mirror, a lens, a CCD, etc. increases a manufacturing cost and when the entire bar-code label is illuminated by a laser beam, a distance between a laser source and the bar-code label is elongated and a bar-code reader cannot be miniaturized because of characteristics of a half field angle of the lens, etc. Such a bar-code reader cannot be provided in the robot mechanism unit carrying the cartridge, and when a proportion of an area occupied by the bar-code reader is increased in the library apparatus, a moving range of the robot mechanism unit and installation of the cells are hampered. In the case of a small library apparatus, a storage efficiency of the cartridges may be reduced.

For example, as shown in FIGS. 15A and 15B, a library apparatus 100 is provided with a bar-code reader 108 at a hand unit 106 of a carrier robot 104 for a cartridge 102. Grippers 110, 112 for gripping the cartridge 102 are provided on the sides of the hand unit 106. A column 114 is a group of a plurality of cells 116 housing the cartridges 102. The carrier robot 104 moves the hand unit 106 vertically along the column 114, positions the bar-code reader 108 at a bar-code label 118 of the reading-target cartridge 102, and reads a bar-code from the bar-code label.

In this case, the bar-code reader 108 is constituted by a CCD 120, a lens 122, etc. and has a relatively large volume on the top surface of the hand unit 106.

In such a bar-code reader 108, the reading position is different from the gripping position of the grippers 110, 112 of the hand unit 106 and, in the example of FIG. 15B, a difference of a height $\Delta h$ is generated. If the bar-code reader 108 is used, after the volume registration by reading a bar-code, the position of the hand unit 106 must be changed to the cartridge 102 that should be gripped to perform a cartridge gripping step in addition to the reading. That is, when putting the cartridge 102 into the library apparatus 100, two steps are needed, which are a step for reading the bar-code label 118 and a step carrying the cartridge 102 to the cell 116. Therefore, it is problematic that an inputting process of the cartridge 102 to the library apparatus 100 takes time.

Japanese Patent Application Laid-Open Publication Nos. 1991-171248 and 1997-91930 do not disclose or indicate such a problem and do not include a configuration or concept for solving the problem.

SUMMARY OF THE INVENTION

A first object of the present invention relates to the bar-code reading from a carried object such as a cartridge and is to enable the bar-code reading from the carried object that is gripped.

A second object of the present invention relates to the bar-code reading from a bar-code attached to a carried object such as a cartridge and is to achieve miniaturization of a hand unit that grips the carried object and that has a function for reading a bar-code.

A third object of the present invention relates to the bar-code reading from a bar-code attached to a carried object such as a cartridge and is to extend a moving range of a hand unit that grips the carried object and that has a function for reading a bar-code.

To achieve the above objects, the present invention includes a bar-code reading unit for a barcode label attached to a carried object such as a cartridge storing a magnetic tape; the bar-code reading unit is provided in a hand unit gripping the carried object at a surface opposite to the carried object; the bar-code reading unit includes a light source that illuminates the bar-code label with light and a light receiving unit that receives reflected light from the bar-code label; and since the bar-code label is detected by light scanning, the gripping of the carried object and the reading of the bar-code label can be performed at the same time to achieve the above objects.

A first aspect of the present invention thus provides a bar-code reading apparatus comprising a bar-code reading unit built into a case of a hand unit that grips a carried object, the bar-code reading unit reading a bar-code of the carried object, the bar-code reading apparatus reading the bar-code from the carried object gripped by the hand unit. According to such a configuration, the bar-code can be read from the carried object gripped by the hand unit to achieve the above objects.

In the bar-code reading apparatus, a light emitting unit and a light receiving unit of the bar-code reading unit are preferably provided at a front surface opposite to the carried object in the case of the hand unit.

The bar-code reading unit preferably includes a point light source and a light receiving unit that generates an output signal representing the bar-code by emitting light from the point light source to the bar-code and by receiving reflected light from the bar-code.

The hand unit preferably includes a scanning mechanism unit that makes the bar-code reading unit perform scanning parallel to the bar-code. According to such a configuration, the scanning of the bar-code can be performed parallel to the bar-code and the bar-code can be read from the carried object gripped by the hand unit.

The bar-code reading apparatus may comprise a scanning mechanism unit that makes the bar-code reading unit perform scanning parallel to the bar-code by installing a screw shaft rotatably in the hand unit and by rotating the screw shaft with a motor.

In the bar-code reading apparatus, in case where the hand unit grips the carried object, the light emitting unit of the bar-code reading unit may be operated to receive the reflected light from the bar-code.

A second aspect of the present invention provides a bar-code reading method comprising the processes of gripping a carried object with a hand unit; performing scanning parallel to a bar-code attached to the carried object and emitting light to the bar-code; and detecting reflected light acquired from the bar-code to acquire detection information of the bar-code. Such a configuration can also achieve the above objects.

The bar-code reading method preferably comprises the processes of scanning the bar-code with the emitted light; and detecting the reflected light from the bar-code correspondingly to the scanning of the light.

In the bar-code reading method, the carried object may be a magnetic tape cartridge with a barcode label attached.

A third aspect of the present invention provides a library apparatus storing cartridges, comprising a carrying unit that carries the cartridge; and a bar-code reading unit that is built into a case of a hand unit installed to the carrying unit to grip the cartridge, the bar-code reading unit reading a bar-code of the cartridge, the library apparatus reading the bar-code from the cartridge gripped by the hand unit.

According to such a configuration, since the bar-code can be read from the cartridge gripped by the hand unit and the bar-code reading unit is built into the case of the hand unit, the hand unit is miniaturized and the moving range thereof is extended.

In the library apparatus, a light emitting unit and a light receiving unit of the bar-code reading unit are preferably provided at a front surface opposite to the cartridge in the case of the hand unit.

The bar-code reading unit preferably include a point light source and the light receiving unit that generates an output signal representing the bar-code by emitting light from the point light source to the bar-code and by receiving reflected light from the bar-code.

In the library apparatus, the hand unit may include a scanning mechanism unit that makes the bar-code reading unit perform scanning parallel to the bar-code.

The library apparatus may comprise a scanning mechanism unit that makes the bar-code reading unit perform scanning parallel to the bar-code by installing a screw shaft rotatably in the hand unit and by rotating the screw shaft with a motor.

In the library apparatus, in case where the hand unit grips the cartridge, the light emitting unit of the bar-code reading unit may be operated to receive reflected light from the bar-code.

A fourth aspect of the present invention provides a bar-code reading program executed by a computer, comprising the steps of outputting instruction information for gripping a carried object to a hand unit; outputting instruction information that makes a light source perform scanning parallel to a bar-code attached to the carried object and emits light to the bar-code; and detecting reflected light acquired from the bar-code to acquire detection information of the bar-code.

The features and advantages of the present invention are listed as follows.

(1) Since a bar-code reading unit reading a bar-code of a carried object is built into a hand unit that grips the carried object, a bar-code reading apparatus can be miniaturized and the gripping of the carried object can be performed concurrently with the reading of the bar-code.

(2) Since a bar-code reading unit reading a bar-code of a cartridge is built into a hand unit that grips the cartridge housing a magnetic tape in a library apparatus, the gripping of the cartridge can be performed concurrently with the reading of the bar-code.

(3) Since a bar-code reading unit reading a bar-code of a cartridge is built into a hand unit that grips the cartridge housing a magnetic tape in a library apparatus, the moving range of the hand unit can be extended and a storage space for the cartridges can be expanded or the library apparatus can be miniaturized with the same storage space.

BRIEF DESCRIPTION OF THE DRAWINGS

Other objects, features, and advantages of the present invention will become more apparent from the following detailed description of the embodiments when taken in conjunction with the accompanying drawings, in which:

FIGS. 14A and 14B show a relationship between the moving range of the hand unit and the installation space of the cells.

DETAILED DESCRIPTION OF THE PREFERRED EMBODIMENTS

First Embodiment

Figure 1:
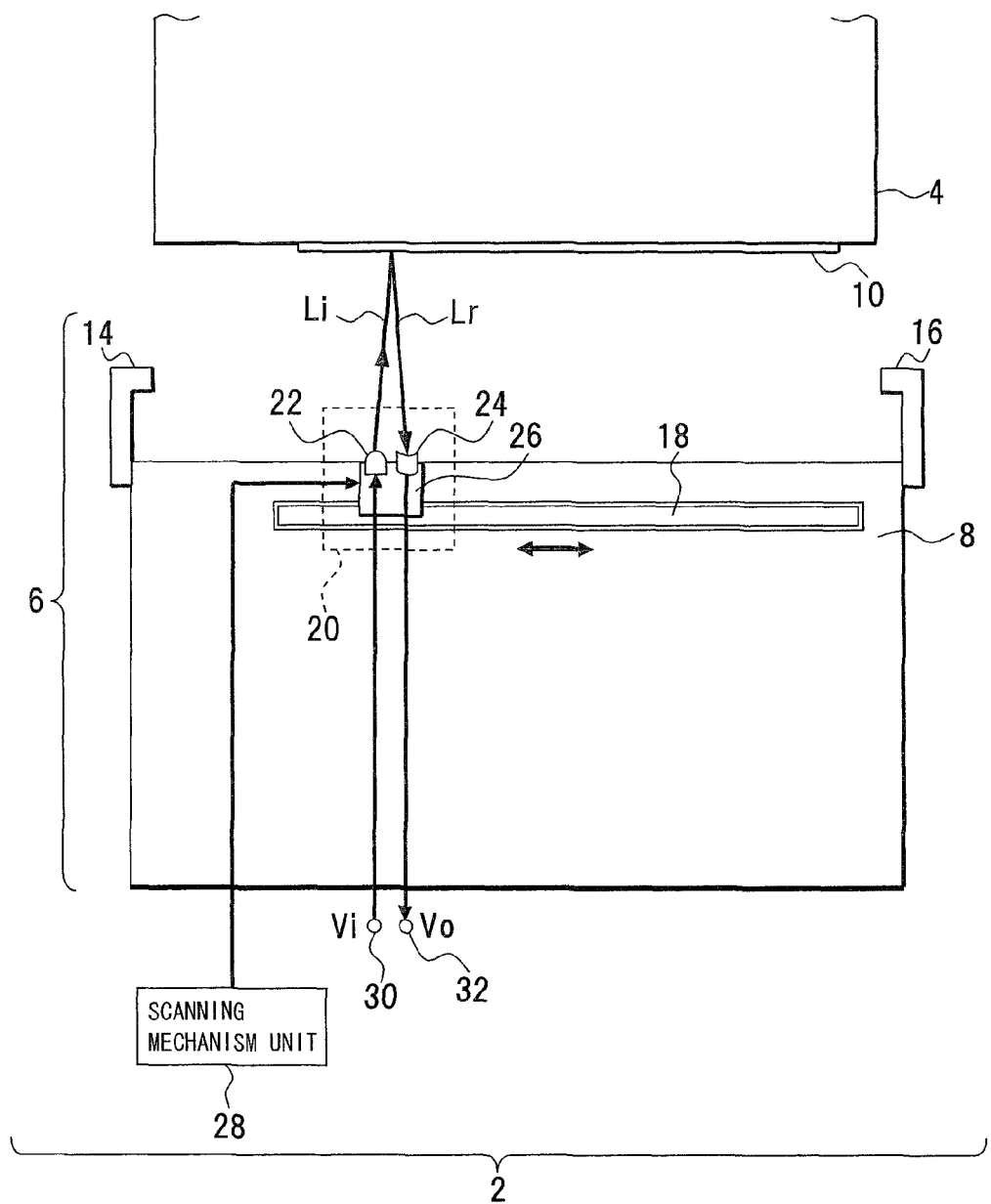
FIG. 1 shows a bar-code reading apparatus according to a first embodiment.
Figure 2:
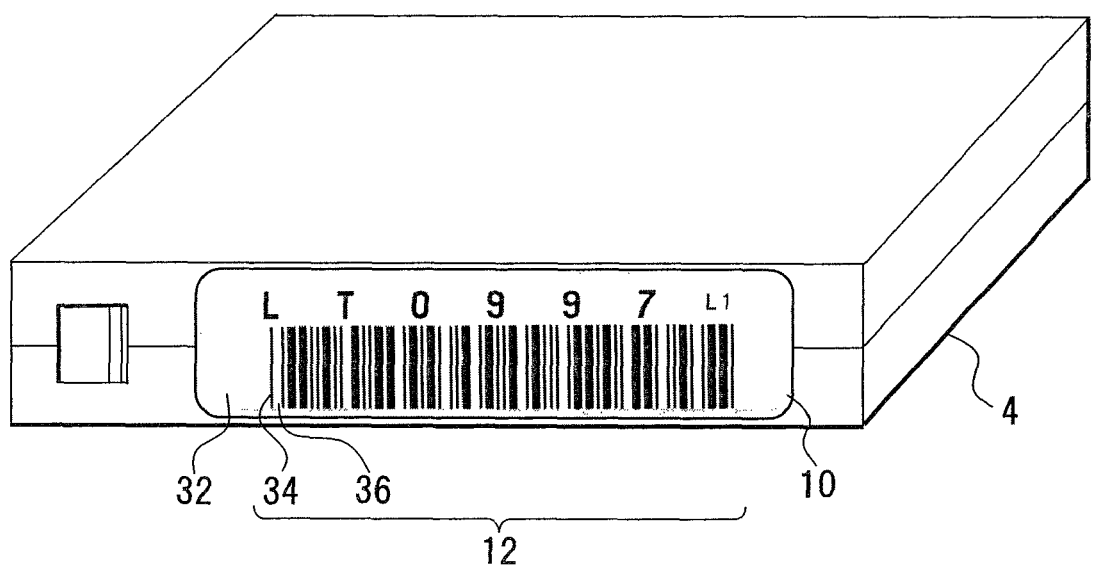
FIG. 2 shows a cartridge with a bar-code label attached.
Figure 3A:
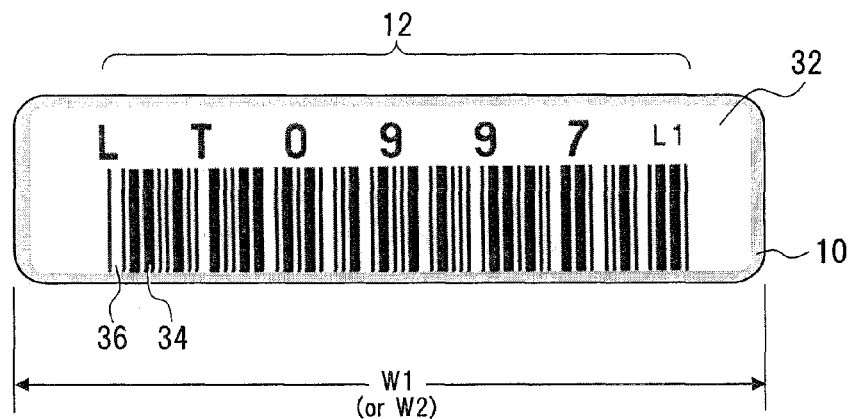
FIGS. 3A, 3B, and 3C show a bar-code reading operation.
Figure 3B:
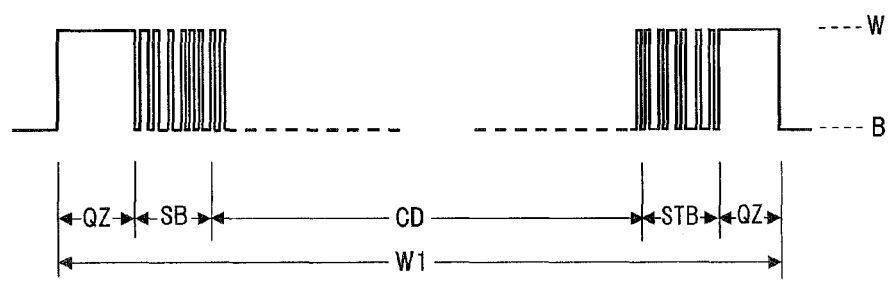
Figure 3C:
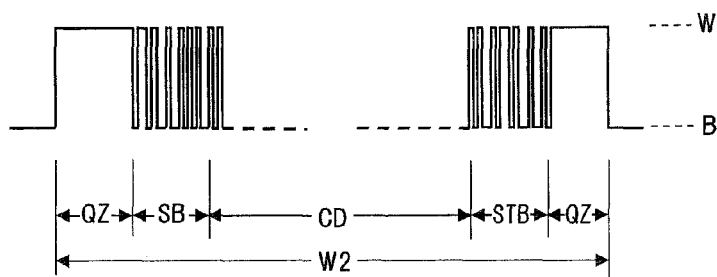

A first embodiment of the present invention will be described with reference to FIGS. 1, 2, and 3A to 3C. FIG. 1 shows a configuration example of a bar-code reading apparatus; FIG. 2 shows a cartridge (magnetic tape cartridge) with a bar-code label attached; and FIGS. 3A to 3C show a bar-code reading operation.

This bar-code reading apparatus 2 is mounted to a hand frame unit 8 of a hand unit 6 that grips a cartridge 4, i.e., a carried object, and is configured to read a bar-code 12 (FIG. 2) from a bar-code label 10 of the cartridge 4 in the middle of the carrying. The hand frame unit 8 is attached with grippers 14, 16 that move right and left to open and close, and the cartridge 4 is gripped by the grippers 14, 16. To read the bar-code 12 from the bar-code label 10 of the cartridge 4, the hand frame unit 8 includes a rail unit 18, and a bar-code reading unit 20 is installed to be moved parallel to the bar-code label 10 with the use of the rail unit 18. The bar-code reading unit 20 is provided with a light emitting device 22 that is a point light source illuminating the bar-code label 10 with a light beam Li and a light receiving device 24 that receives reflected light Lr from the bar-code label 10. The light emitting device 22 is constituted by a light-emitting diode, for example, and the light receiving device 24 is constituted by a light-sensitive transistor, for example. The light emitting device 22 and the light receiving device 24 are mounted in a casing unit 26 and a bar-code reading module is constituted by the light emitting device 22, the light receiving device 24, and the casing unit 26.

The bar-code reading unit 20 performs scanning parallel to the bar-code label 10 due to a scanning mechanism unit 28. When a drive voltage Vi is applied to a input terminal 30, the light emitting device 22 emits light as a point light source and the bar-code label 10 is illuminated with the light beam Li. The reflected light Lr from the bar-code label 10 is received by the light receiving device 24; a detection signal Vo is acquired from the light receiving device 24; and the detection signal Vo can be picked up from an output terminal 32. The bar-code 12 can be read from the changes in the level of the detection signal Vo.

As shown in FIGS. 2 and 3A to 3C, in the bar-code 12, bar-code data representing a volume identifier, etc. are written by arranging bars 34 having a constant length and different widths on a white background 32 and by establishing intervals 36 with different width between the bars 34. When the bar-code 12 is illuminated with the light beam Li and the scanning mechanism unit 28 makes the bar-code reading unit 20 perform the scanning along the bar-code 12, output signals Vo can be acquired which have different levels representing the bars 34 of the bar-code 12.

In this case, when the bar-code reading unit 20 performs the scanning to illuminate the bar-code label 10 shown in FIG. 3A with the light beam Li correspondingly to a length W1 of the bar-code label 10, the light receiving device 24 can acquire the pulsed detection signals Vo correspondingly to the bars 34, the intervals 36, etc. of the bar-code 12 as shown in FIG. 3B. A quiet zone QZ, start bit SB, character data CD, stop bit STB and quiet zone QZ are set within the length W1 of the bar-code label 10. Therefore, the character data CD can be read for bar-code data from the received signals.

In this case, the scanning mechanism unit 28 may make the bar-code reading unit 20 perform the scanning correspondingly to the length W1 or W2 of the bar-code label 10, and if the bar-code label 10 has a shorter length W2, the received signals are acquired correspondingly to that length as shown in FIG. 3C.

In the bar-code reading apparatus 2 and the reading method thereof, the bar-code 12 can be read with a simple mechanism from the bar-code label 10 of the cartridge 4 gripped by the hand unit 6 and the volume identifier of the cartridge 4 carried by the hand unit 6 can be easily read in the middle of the carrying.

Second Embodiment

Figure 4:
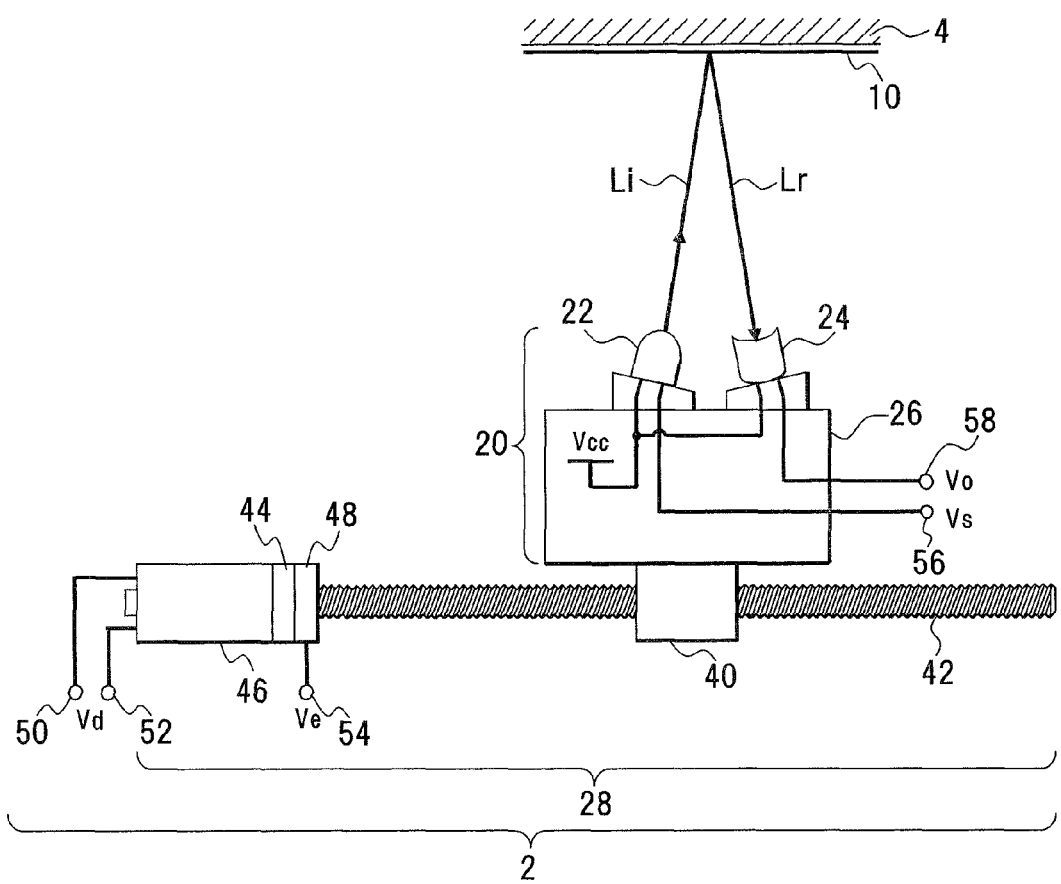
FIG. 4 shows a bar-code reading apparatus according to a second embodiment.

A second embodiment of the present invention will be described with reference to FIG. 4. FIG. 4 shows a configuration example of a bar-code reading apparatus. In FIG. 4, the same numerals are added to the same portions as FIG. 1.

In this embodiment, the scanning mechanism unit 28 is constituted by a slider 40, a screw shaft 42, a gear box 44, a drive motor 46, etc. to make the bar-code reading unit 20 perform the scanning parallel to the bar-code label 10. That is, the slider 40 equipped with the bar-code reading unit 20 is attached to the screw shaft 42 also called a string screw or ball screw and is moved right and left by the rotation of the screw shaft 42. The screw shaft 42 is linked to the drive motor 46 via the gear box 44. The gear box 44 is provided with an encoder 48, which is rotation detecting means that detect the rotation.

When a motor drive voltage Vd is applied from drive input terminals 50, 52 to the drive motor 46, the drive motor 46 rotates at a constant speed and the rotation is transmitted to the screw shaft 42 via the gear box 44 to rotate the screw shaft 42. The slider 40 is moved by the constant speed of the screw shaft 42 and the bar-code reading unit 20 performs the scanning parallel to the bar-code label 10. The rotation of the screw shaft 42 is detected by the encoder 48 and a rotation detection output Ve is acquired from an output terminal 54.

A power supply voltage Vcc is applied to one end of each of the light emitting device 22 and the light receiving device 24 in common; the other end of the light emitting device 22 is provided with a switching control input terminal 56; and the other end of light receiving device 24 is provided with an output terminal 58. When a switching control signal Vs is applied to a switching control input terminal 56, the light emitting device 22 emits light and the light beam Li illuminates the bar-code 12 of the bar-code label 10. With the scanning of the light beam Li, the light receiving device 24 detects the reflected light Lr and acquires the output signal Vo. The output signal Vo is picked up through the output terminal 58.

Therefore, in this embodiment, the bar-code 12 can also be read from the bar-code reading unit 20 and, as is the case with the first embodiment, the volume identifier can be read from the cartridge 4 that is being carried.

Third Embodiment

Figure 5:
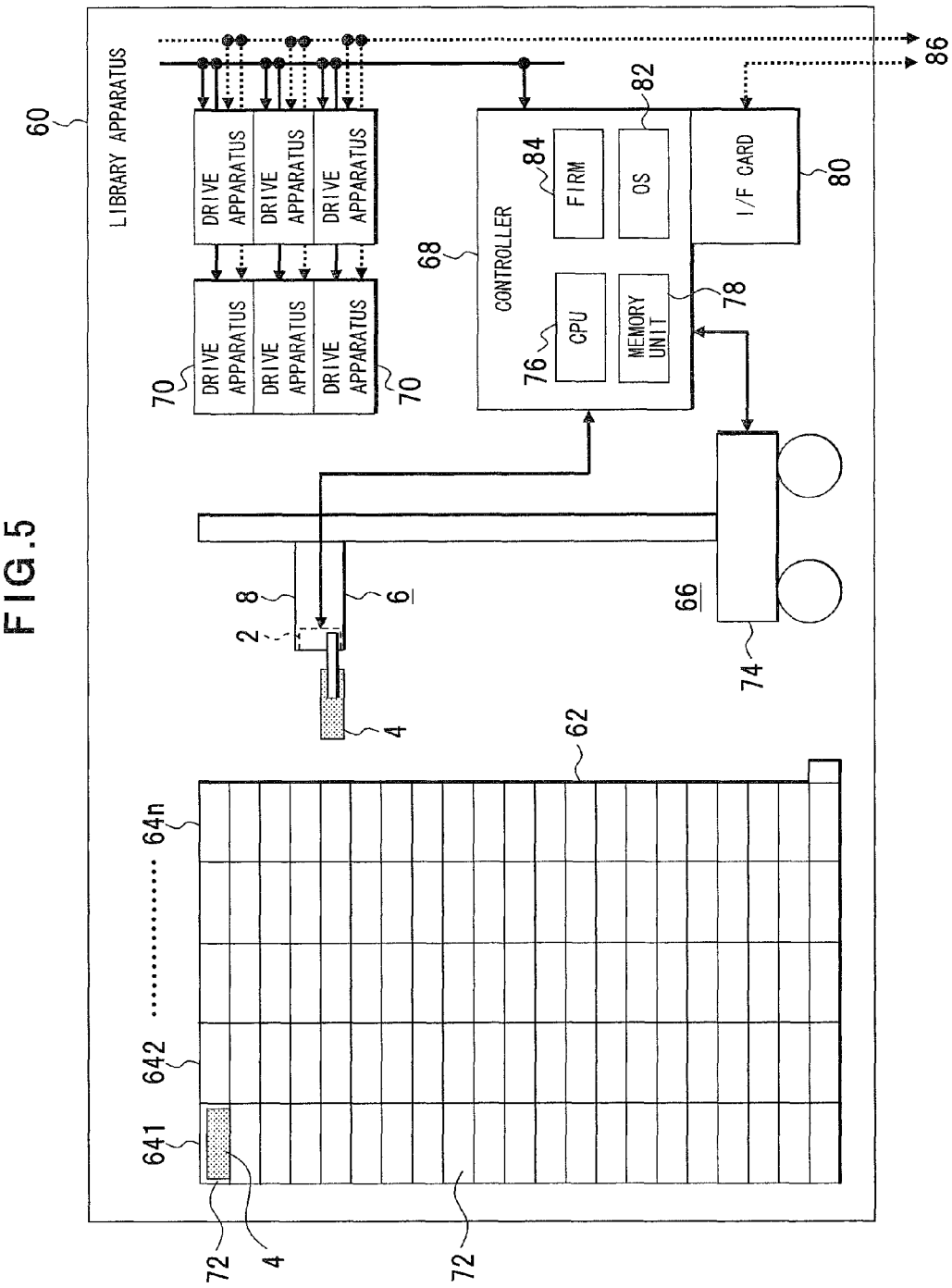
FIG. 5 shows a library apparatus according to a third embodiment.
Figure 6:
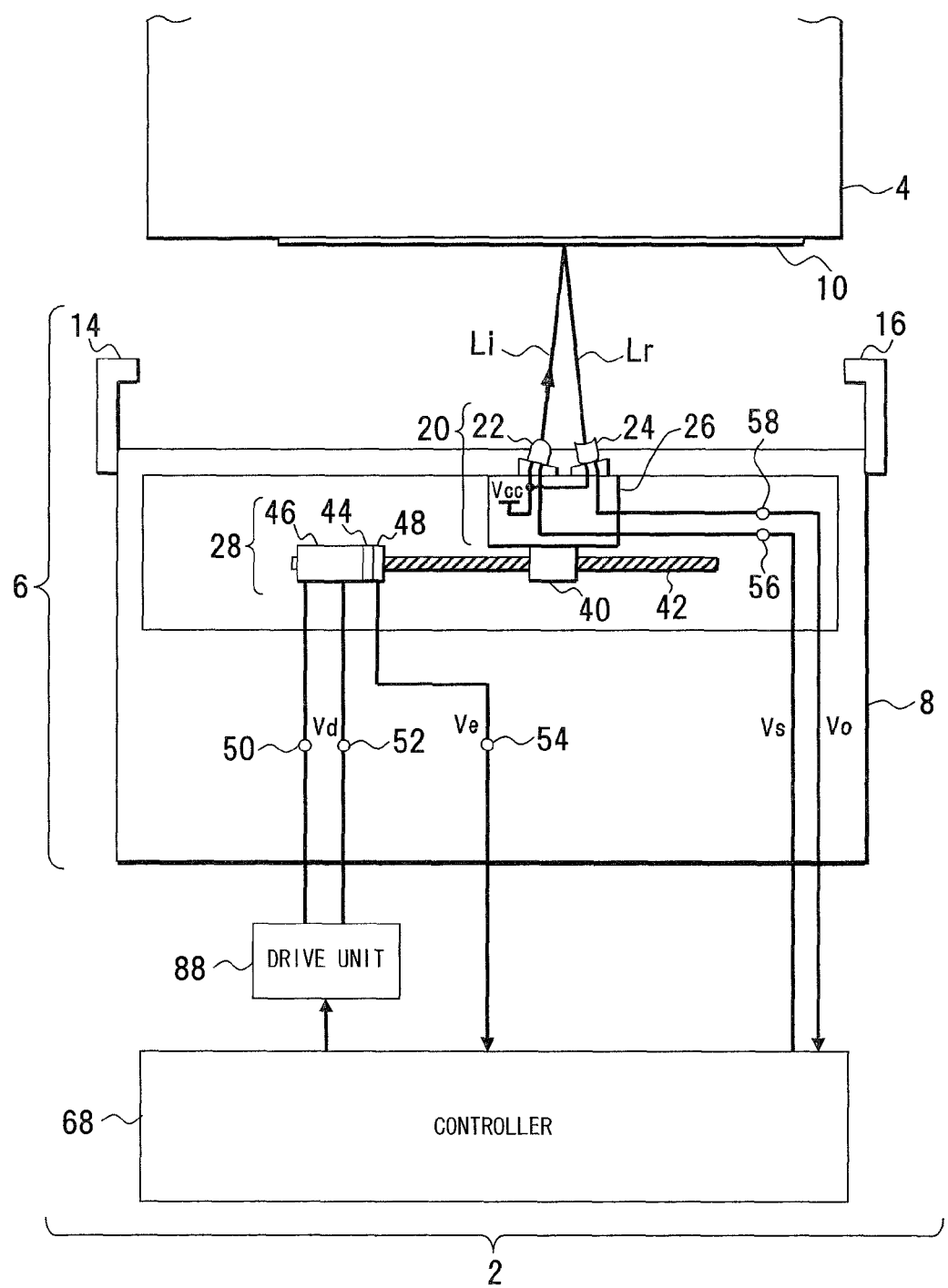
FIG. 6 shows the bar-code reading apparatus in the library apparatus.
Figure 7:
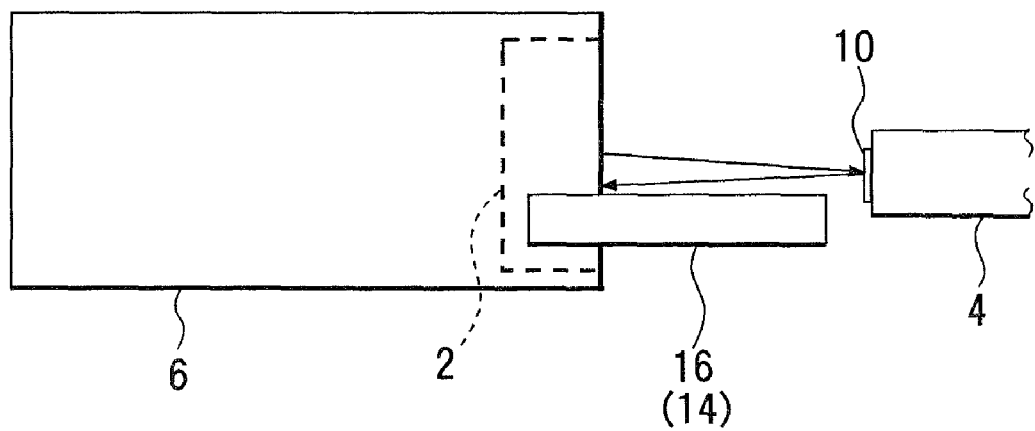
FIG. 7 shows a relationship among a hand unit, the bar-code reading apparatus, and the cartridge.
Figure 8:
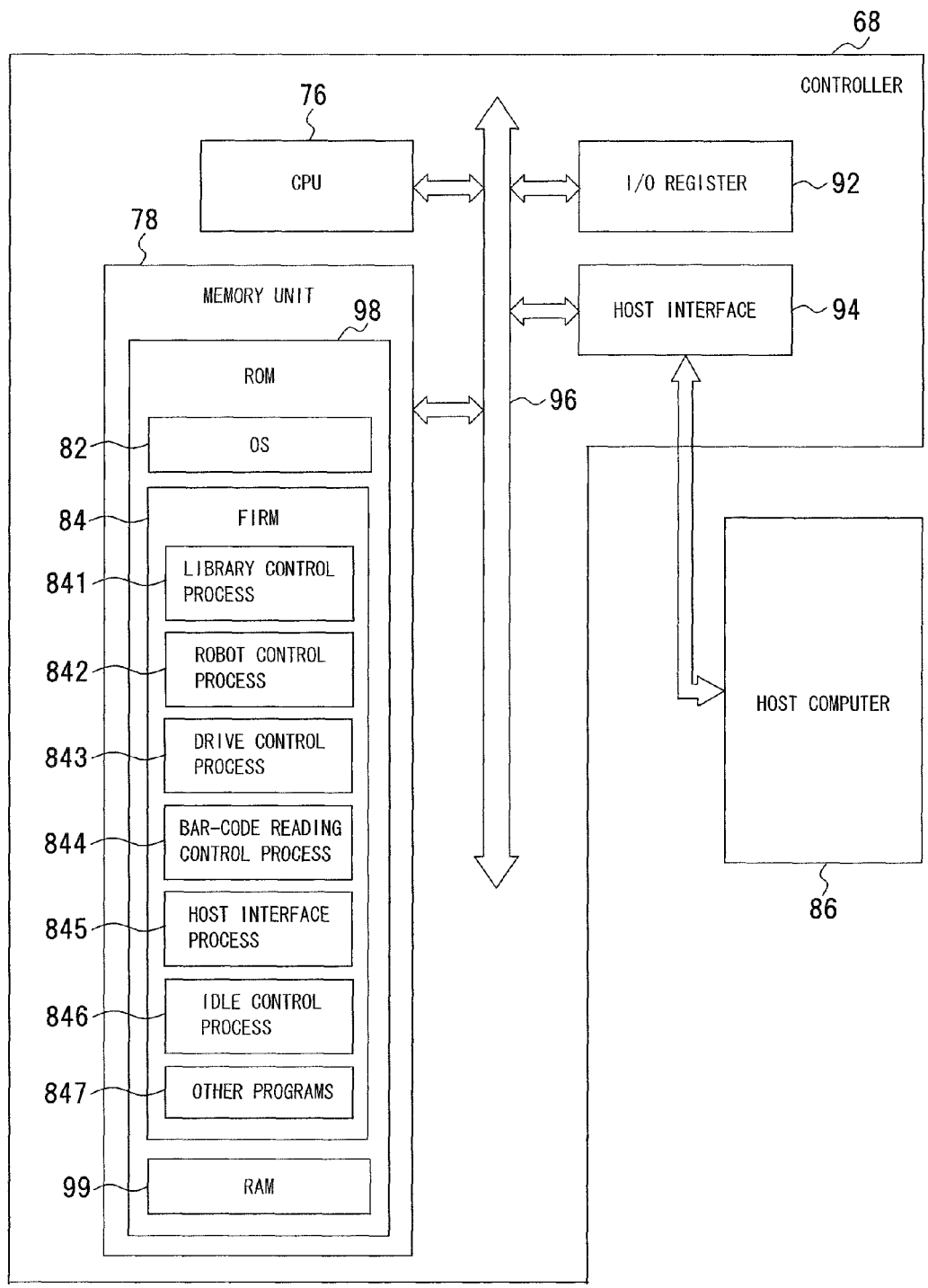
FIG. 8 is a block diagram of an example of a controller.

A third embodiment of the present invention will be described with reference to FIGS. 5, 6, 7, and 8. FIG. 5 shows a configuration of a library apparatus; FIG. 6 shows a configuration of the bar-code reading apparatus in the library apparatus; FIG. 7 shows a relationship among the hand unit, the bar-code reading apparatus, and the cartridge; and FIG. 8 is a block diagram of an example of a controller. In FIGS. 5, 6, and 7, the same numerals are added to the same portions as FIG. 1 or 4.

As shown in FIG. 5, this library apparatus 60 is provided with a casing unit 62, a plurality of columns 641, 642 . . . 64n, a carrier robot 66, a controller 68, and a plurality of drive apparatuses 70.

Each column 641, 642 . . . 64n are a group of cells 72 and each cell 72 stores the cartridge 4. As described above, the cartridge 4 may be a magnetic tape cartridge or other recording mediums.

The carrier robot 66 is carrying means for carrying the cartridge 4 from each cell 72 to the arbitrary drive apparatus 70 and from each drive apparatus 70 to the arbitrary cell 72. The carrier robot 66 includes the hand unit 6 provided with a hand mechanism that grips the cartridge 4 and also includes a transport mechanism 74 in the X-axis, Y-axis, and Z-axis directions, which is a robot mechanism unit for transporting the hand unit 6 to the arbitrary cell 72 or drive apparatus 70.

The hand unit 6 is provided with the bar-code reading apparatus 2 and, as described above, the bar-code reading apparatus 2 performs the scanning of the bar-code label 10 of the cartridge 4 gripped by the hand unit 6 to read the bar-code 12.

The controller 68 is constituted by a computer and controls the carrier robot 66, the hand unit 66, a bar-code reading apparatus 2, the drive apparatuses 70, etc. The controller 68 is equipped with hardware, such as a CPU (Central Processing Unit) 76, a memory unit 78, and an interface (I/F) card 80, and software, such as an operating system (OS) 82 and firmware (FIRM) 84. The I/F card 80 constitutes an input/output unit of the controller 68 and the controller 68 is connected to an external host computer 86 (FIG. 8) through the I/F card 80.

The drive apparatus 70 is controlled by the controller 68 and connected to the host computer (FIG. 8) to write data from the controller 68 or the host computer 86 into the magnetic tape of the cartridge 4 and to output data read from the magnetic tape to the controller 68 or the host computer 86. In FIG. 5, solid lines show the connection with the controller 68 and dotted lines show the connection with the host computer 86.

As shown in FIG. 5, the bar-code reading apparatus 2 is mounted on the front side of the hand frame unit 8 of the hand unit 6 and is constituted by the bar-code reading unit 20 and the scanning mechanism unit 28, which is the drive motor 46, the gear box 44, the slider 40, the screw shaft 42, etc., as described above. These components have been described with reference to FIG. 4 and will not be described.

As shown in FIG. 6, a driving unit 88 connected to the drive motor 46 is controlled by the controller 68 and applies the drive voltage Vd to the drive motor 46. The rotation detection output Ve of the encoder 48 connected to the drive motor 46 is applied to the controller 68 for the rotation information. The switching control signal Vs is applied from the controller 68 to the light emitting device 22 and the output signal Vo of the light receiving device 24 is applied to the controller 68.

As shown in FIG. 7, the bar-code reading apparatus 2 is installed in the hand unit 6 at a surface opposite to the cartridge 4 and can read the bar-code 12 from the bar-code label 10 while the grippers 14, 16 is gripping the cartridge 4 or while the hand unit 6 is ready to grip before the gripping operation.

As shown in FIG. 8, the controller 68 includes the CPU 76, the memory unit 78, an I/O register 92, a host interface 94, etc., which are connected by a bus 96. The memory unit 78 stores a ROM (Read-Only Memory) 98, a RAM (Random-Access Memory) 99, etc., and the ROM 98 stores the OS 82, the FIRM 84, and various programs. The FIRM 84 includes a library control process 841, a robot control process 842, a drive control process 843, a bar-code reading control process 844, a host interface process 845, an idle control process 846, and other programs 847.

The controller 68 moves horizontally and positions the hand unit 6 at the cartridges 4 in the cell 72 and makes the bar-code reading unit 20 of the bar-code reading apparatus 2 perform the horizontal scanning of the bar-code label 10 to read the bar-code 12.

That is, while the hand unit 6 is gripping the cartridge 4, the bar-code reading unit 20 of the bar-code reading apparatus 2 can scan the bar-code label 10 horizontally and parallel. By emitting the light beam Li in this scanning, the reflected light Lr and the black bars 34 and white intervals 36 of the bar-code 12 can be detected and determined.

Since the bar-code reading apparatus 2 can moves the bar-code reading unit 20 closer to the bar-code label 10, the bar-code reading apparatus 2 can reduce the effect of disturbance light, can accurately detect the widths of the bars 34 printed on the bar-code label 10, and can scan at a constant speed to improve the reading rate of the bar-code 12.

The control system of the bar-code reading apparatus 2 can be built into the controller 68 of the library apparatus 60; a dedicated circuit for the bar-code reading is not needed; and the drive unit 88 (FIG. 6) can also be built into the controller 68.

Description will be made of the operations of the library apparatus 60 and the bar-code reading apparatus 2.

Figure 9:
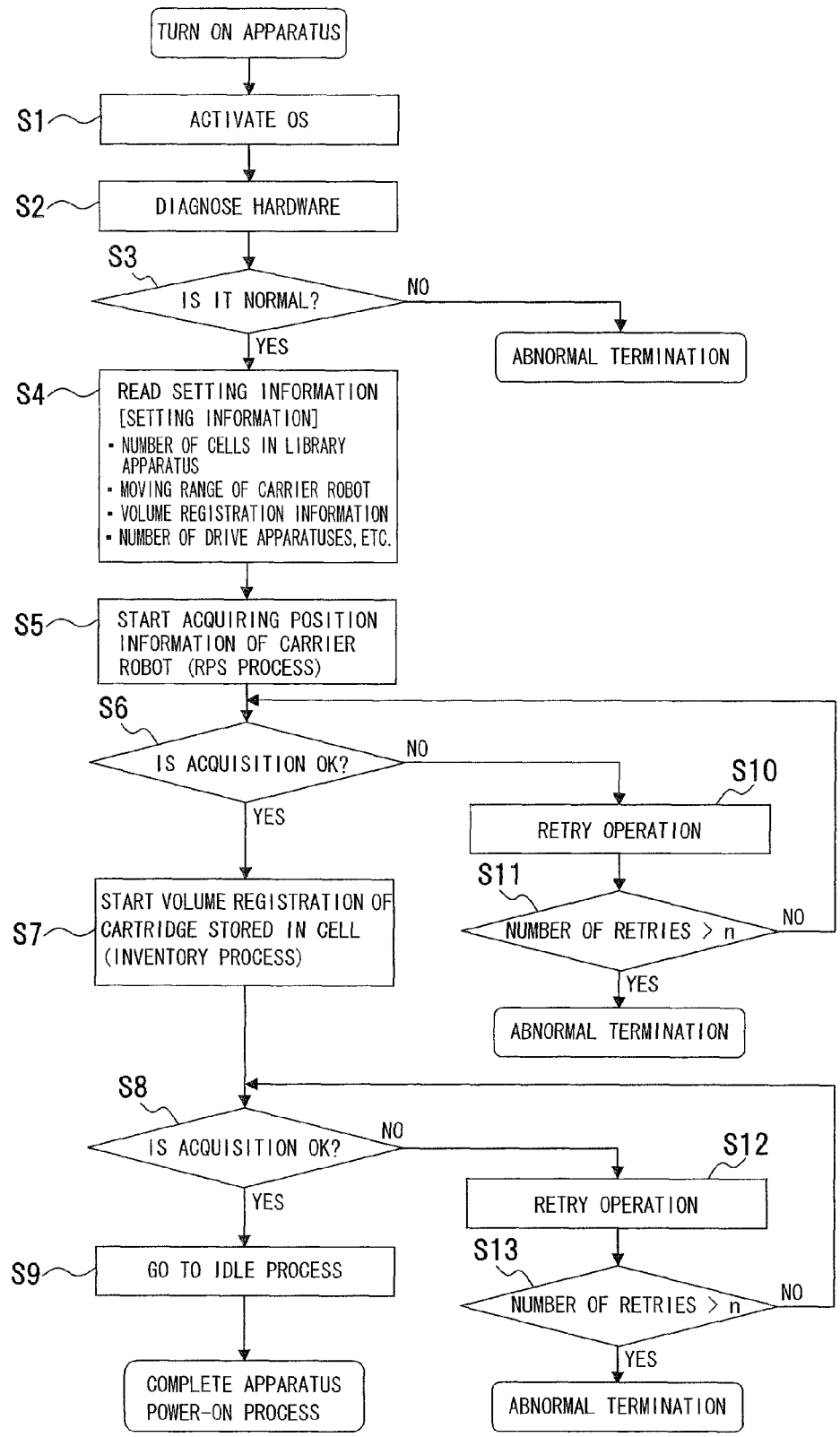
FIG. 9 is a flowchart of a process procedure of a power-on operation in the library apparatus.

Description will be made of the operation of the library apparatus 60 at the time of power-on with reference to FIG. 9. FIG. 9 is a flowchart of the operation of the library apparatus at the time of power-on.

When powered on, the OS 82 is activated (step S1); a hardware diagnosis is started (step S2); it is determined whether the result of diagnosis is normal or not (step S3); and if the apparatus is abnormal (NO at step S3), the operation is terminated. If the apparatus is normal, setting information is read (step S4). In this case, the setting information is the number of the cells of the library apparatus 60, a moving range of the carrier robot 66, the volume registration information, the number of the drive apparatuses 70, etc.

After the reading of the setting information is completed, a RPS (Relative Positioning System) process starts to acquire the position information of the carrier robot 66 (step S5). The RPS process is a process for acquiring relative position information of the carrier robot 66 and the cell 72 and is a process for absorbing mechanical and physical variations.

After this process, it is determined whether the position information has been acquired or not (step S6) and if the position information has been acquired (YES at step S6), volume registration is performed for the cartridge 4 stored in the cell 72. The volume registration is performed by an inventory process, and the inventory process is a process reading the bar-code 12 from the bar-code label 10 of the cartridge 4.

After the inventory process, it is determined whether the volume information has been acquired or not (step S8) and if the volume information has been acquired (YES at step S8), the procedure goes to an idle process (step S9) and the power-on process is terminated.

If the position information of the carrier robot 66 cannot be acquired at step S6 (NO at step S6), a retry operation is performed to acquire the position information of the carrier robot 66 (step S10); it is monitored whether or not the number of the retries reaches a predetermined number n (step S11); and the retry operation is repeated until the number of the retries reaches the predetermined number n to try to acquire the position information of the carrier robot 66. If the number of the retries exceeds the predetermined number n (YES at step S11), it is determined that the apparatus is abnormal, and the power-on process is terminated.

If the volume information cannot be acquired at step S8 (NO at step S8), a retry operation is performed to acquire the volume information (step S12); it is monitored whether or not the number of the retries reaches a predetermined number n (step S13); and the retry operation is repeated until the number of the retries reaches the predetermined number n to try to acquire the volume information of the cartridge 4. If the number of the retries exceeds the predetermined number n (YES at step S13), it is determined that the apparatus is abnormal, and the power-on process is terminated.

Figure 10:
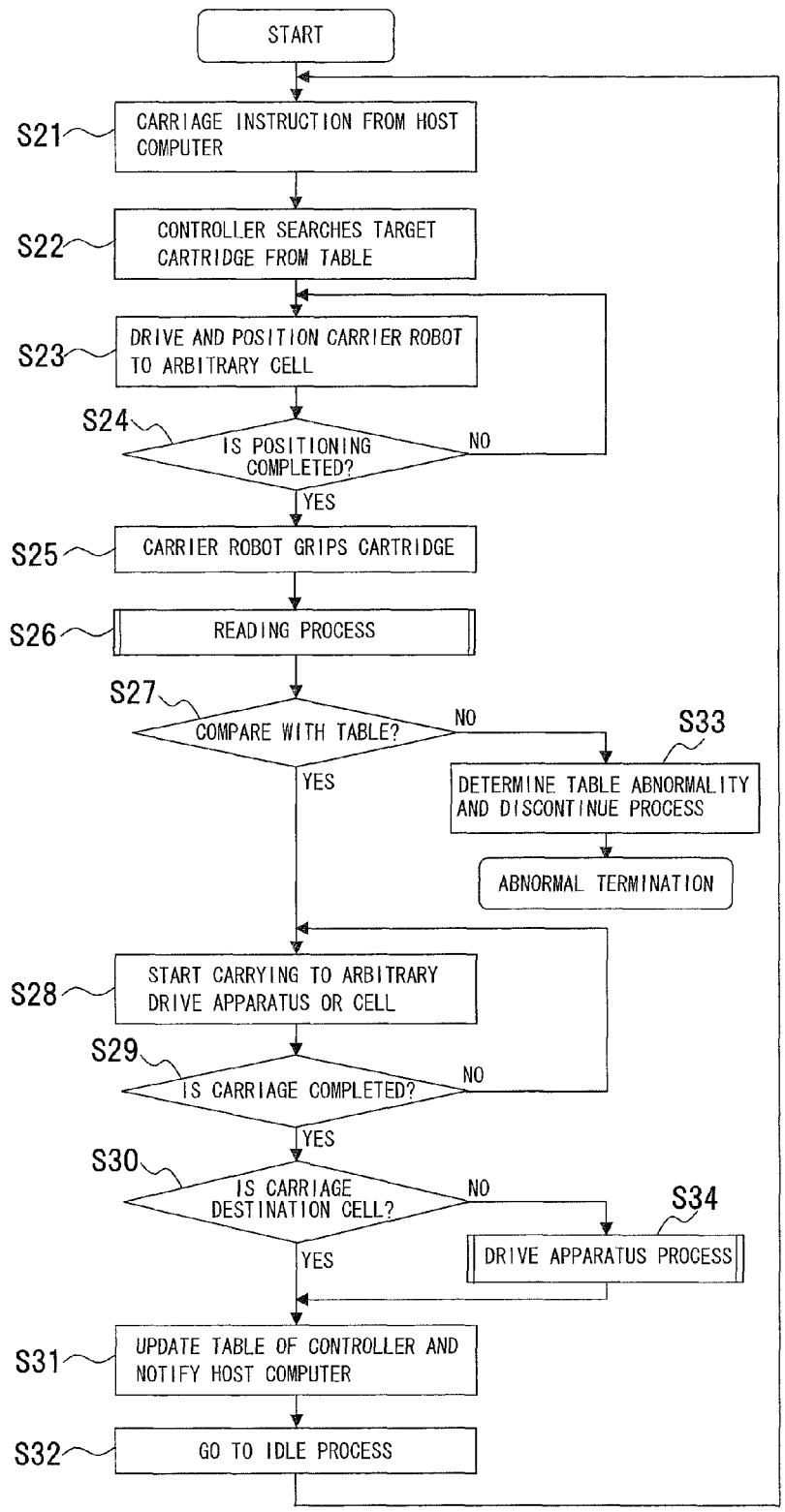
FIG. 10 is a flowchart of a process procedure for carrying the cartridge, etc. in the library apparatus.

Description will be made of the cartridge carrying operation with reference to FIGS. 10 and 11. FIG. 10 is a flowchart of the cartridge carrying operation of the library apparatus and FIG. 11 is a flowchart of a process procedure of a drive apparatus.

With a carriage instruction from the host computer 86 (step S21), the controller 68 searches a table in the memory unit 78 to identify the target cartridge 4 (step S22) and moves and positions the carrier robot 66 to the arbitrary cell 72 (step S23). It is determined whether the positioning of the carrier robot 66 to the cell 72 is completed or not (step S24); the positioning operation is continued until the positioning is completed; and if the positioning is completed (YES at step S24), the carrier robot 66 grips the cartridge 4 (step S25). A bar-code 12 reading process (step S26) is performed for this cartridge 4. The reading process is performed in accordance with a flow chart shown in FIG. 12. In this process, the volume information read from the cartridge 12 is compared with the information of the table (step S27); if the information is identical, the carriage to the arbitrary drive apparatus 70 or cell 72 is started (step S28); and the carriage is monitored (step S29). If the carriage is completed (YES at step S29), it is determined whether the carriage destination is the cell 72 or not (step S30); if the carriage destination is the cell 72 (YES at step S30), the table in the memory unit 78 of the controller 68 is updated and the host computer 86 is notified (step S31); and the procedure goes to the idle process (step S32) and is returned to the carriage instruction from the host computer 86 (step S21).

If the table has no volume information when comparing with the table at step S27, it is determined that the apparatus is abnormal, and the process is discontinued (step S33) to terminate this process.

Figure 11:
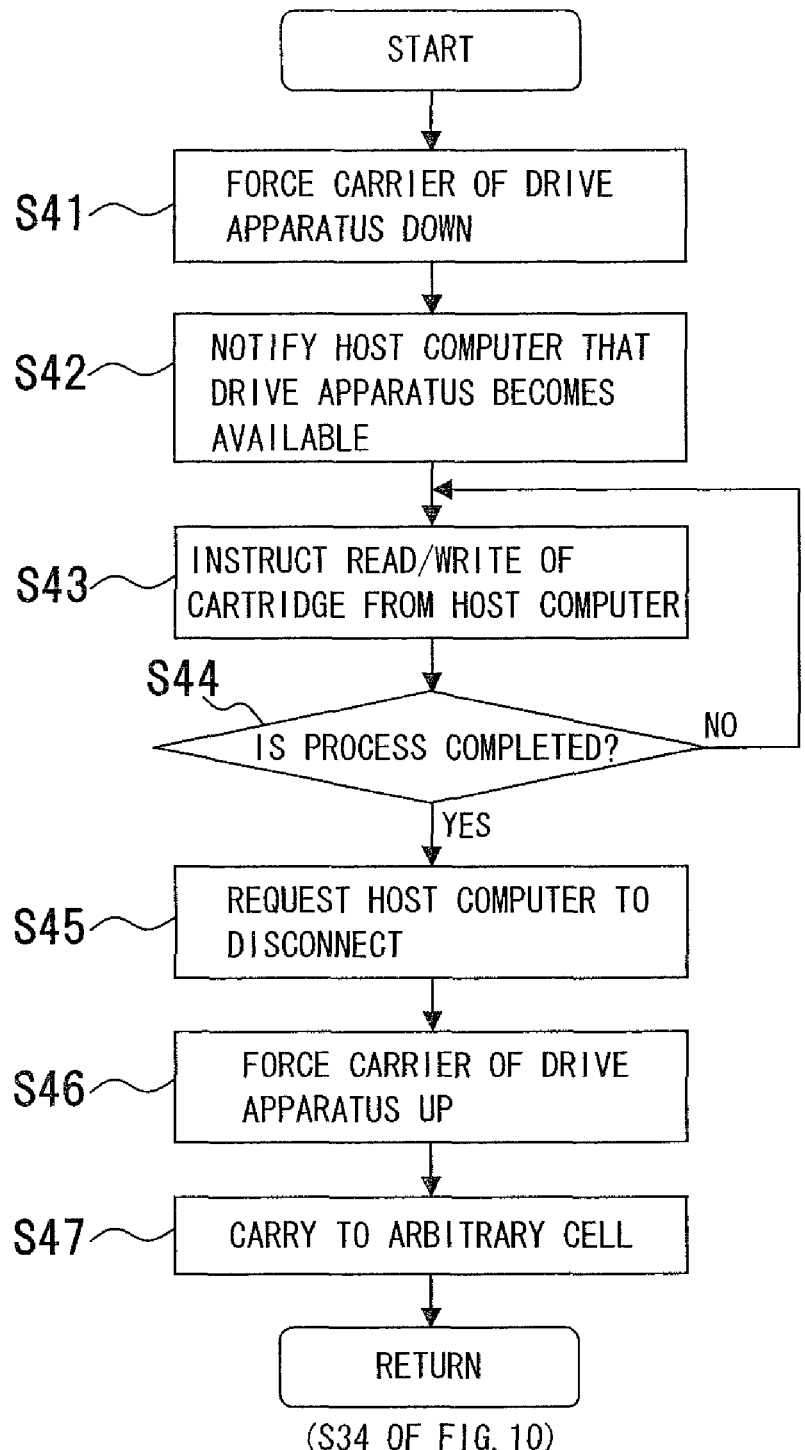
FIG. 11 is a flowchart of a process procedure of a drive apparatus.

If the carriage destination is not the cell 72 at step S30 (NO at step S30), the drive apparatus process shown in FIG. 11 is performed (step S34).

As shown in FIG. 11, in the drive apparatus process, the carrier of the drive apparatus 70 is forced down (step S41); the host computer 86 is notified that the drive apparatus 70 becomes available (step S42); a read/write instruction for the magnetic tape of the cartridge 4 is received from the host computer 86 to perform the read/write process (step S43). This process is monitored (step S44); if the process is completed (YES at step S44), disconnection is requested from the drive apparatus 70 to the host computer 86 (step S45); the carrier of the drive apparatus 70 is forced up (step S46); the carriage to the arbitrary cell 72 is performed (step S47); and the procedure is returned to step S34 (FIG. 10).

Figure 12:
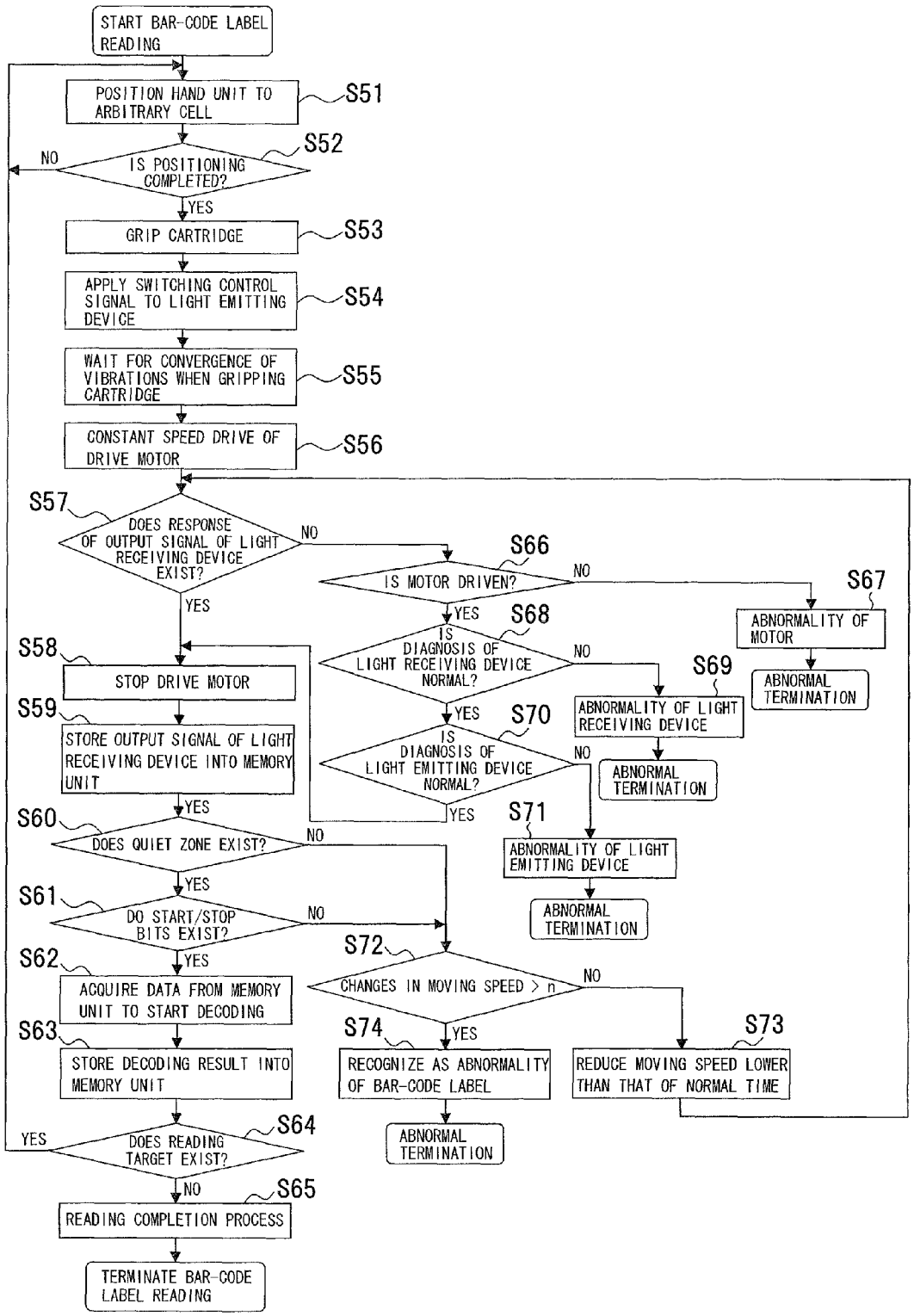
FIG. 12 is a flowchart of a process procedure for reading the bar-code label.

Description will be made of the bar-code reading process with reference to FIGS. 12 and 13. FIG. 12 is a flowchart of a process procedure of the bar-code reading process and FIG. 13 shows a bar-code reading operation.

In the bar-code reading process, the carrier robot 66 is operated to perform the operation for positioning the hand unit 6 to the arbitrary cell 72 (step S51); this positioning operation is monitored (step S52); if the positioning of the hand unit 6 to the arbitrary cell 72 is completed (YES at step S52), the cartridge 4 is gripped by the grippers 14, 16 (step S53); the light emitting device 22 is allowed to emit light by the input of the switching control signal (step S54); vibrations due to the gripping of the cartridge 4 are waited to be converged for a certain time period, for example, 100 [ms] (step S55); after the waiting period has elapsed, the drive motor 46 is driven at a constant speed (step S56); and the bar-code label 10 is illuminated with the light beam Li.

Since the reflected light Lr can be acquired from the bar-code 12 by illuminating with the light, the response of the output signal of the light receiving device 24 is monitored (step S57) to detect the output signal of the light receiving device 24. If the response of the output signal exists (YES at step S57), the drive motor 46 is stopped (step S58); the output signal of the light receiving device 24 is stored in the memory unit 78 (step S59); it is monitored whether the quiet zone exists or not (step S60); if the quiet zone exists (YES at step S60), it is monitored whether the start/stop bits exist (step S61); and if the start/stop bits exist (YES at step S61), data are acquired from the memory unit 78 to start decoding (step S62). The result of the decoding is stored in the memory unit 78 (step S63).

It is monitored whether a reading target exists or not (step S64), and if the reading target does not exist (NO at step S64), a reading completion process (step S65) is performed to terminate the reading of the bar-code label 10. If the reading target exists (YES at step 64), the procedure is returned to step S51.

If the output signal of the light receiving device 24 cannot be acquired (NO at step S57), it is presumed that some kind of abnormality exists; therefore, it is determined whether the drive motor 46 is driven (step S66); if the drive motor 46 is not rotated (NO at step S66), it is determined that the motor is abnormal (step S67); and this process is terminated.

If the drive motor 46 is driven (YES at step S66) the light receiving device 24 is diagnosed (step S68), and if the light receiving device 24 is abnormal (NO at step S68), the abnormality is determined (step S69) and this process is terminated.

If the light receiving device 24 is normal (YES at step S68), the light emitting device 22 is diagnosed (step S70), if the light emitting device 22 is abnormal (No at step S70), the abnormality is determined (step S71) and this process is terminated. If the light emitting device 22 is normal (YES at step S70), the procedure goes to step S58.

If the quiet zone does not exist at step S60 (NO at step 60), the movement speed is changed stepwise and it is determined whether the number of the changes exceeds a predetermined number n or not (step S72); if the number of times of the change is equal to or less than the predetermined number n (NO at step 72), the movement speed is reduced lower than that of normal time (step S73); and the procedure goes to step 57. If the bar-code 12 cannot be detected even when the number of times of the change exceeds the predetermined number n (YES at step 72), it is recognized that the bar-code label 10 is abnormal (step S74) and this process is terminated.

Figure 13A:
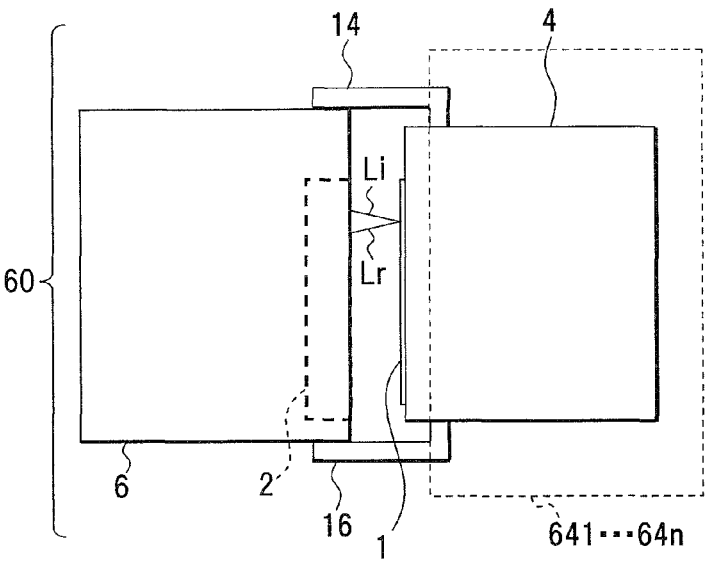
FIGS. 13A and 13B show cartridge carrying and bar-code label reading operations in a cell.
Figure 13B:
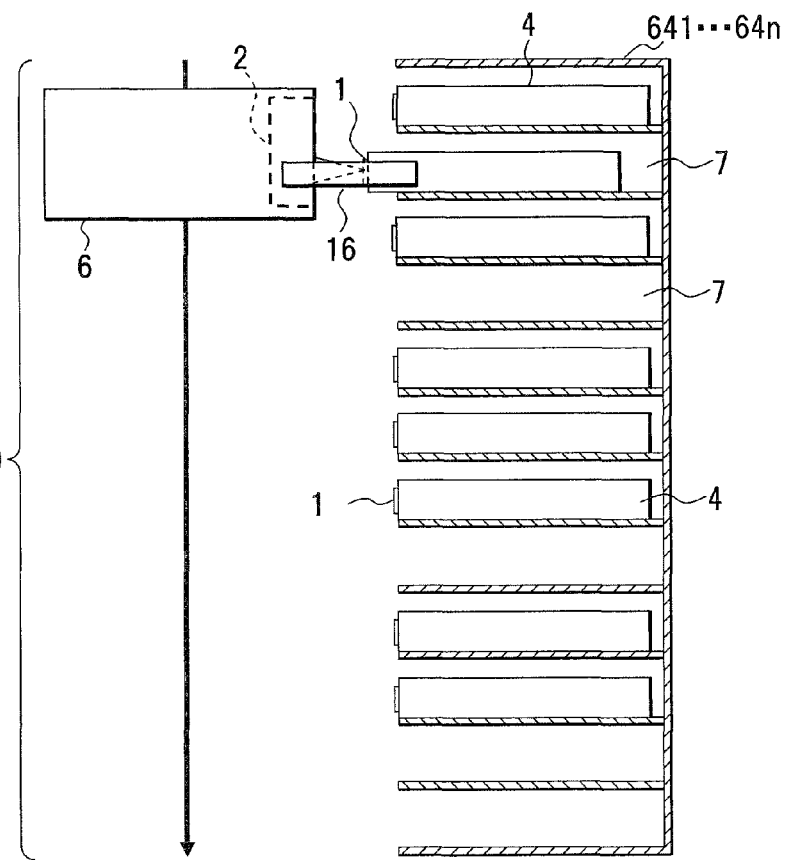
Figure 15A:
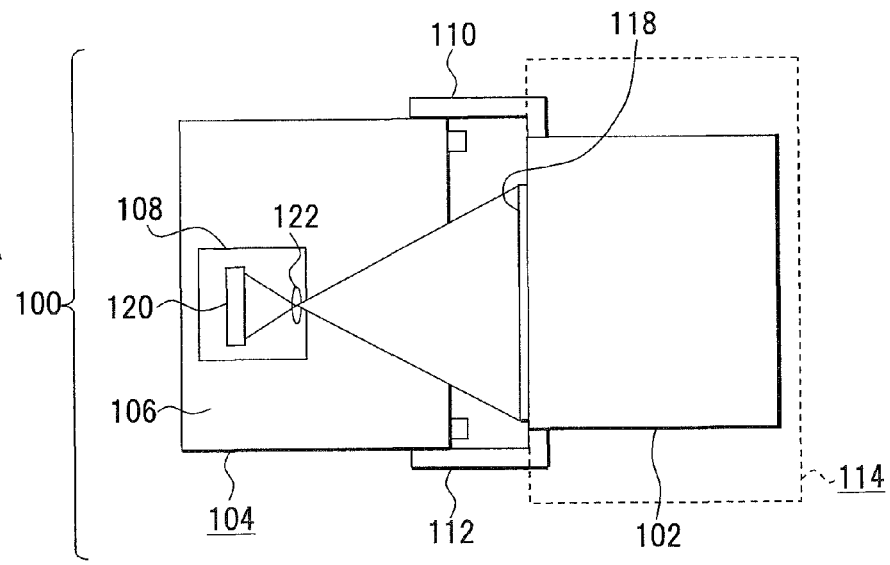
FIGS. 15A and 15B show cartridge carrying and bar-code label reading operations in a conventional library apparatus.
Figure 15B:
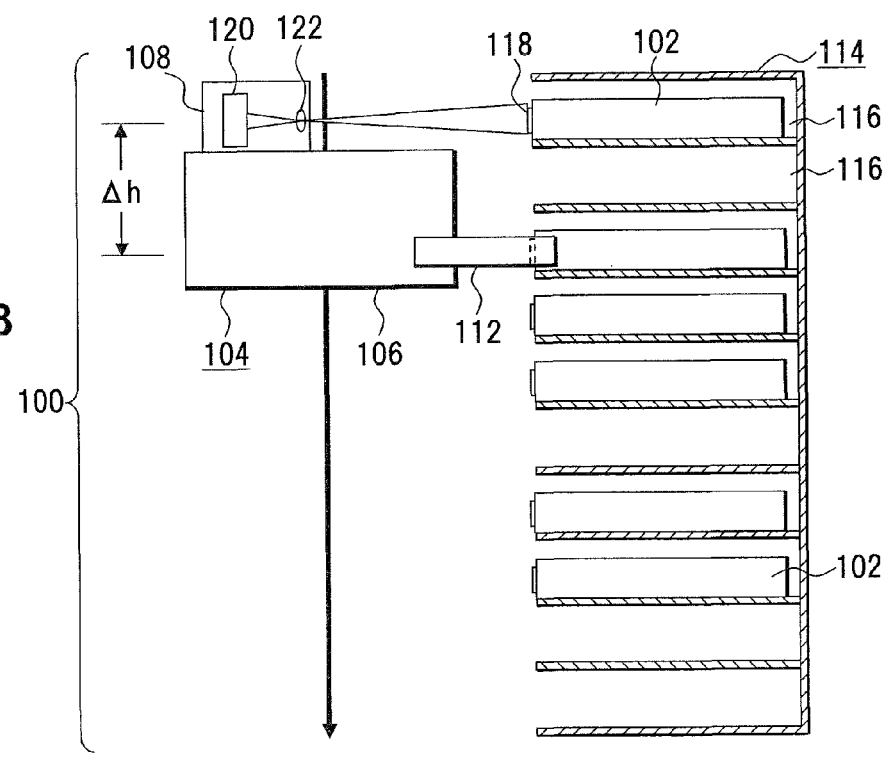

As shown in FIG. 13A, when the hand unit 6 is positioned to the arbitrary cell 72, the bar-code label 10 of the cartridge 4 is illuminated with the light beam Li from the light emitting device 22 of the bar-code reading unit 20 of the bar-code reading apparatus 2, and the reflected light Lr is detected by the light receiving device 24. The bar-code label 10 detecting process and the cartridge 4 carrying process are performed in a single process as shown in FIG. 13B.

As described above, since the bar-code reading unit is installed on the front surface of the hand unit 6, the bar-code label 10 of the cartridge 4 can be read in the middle of the gripping operation of the hand unit 6 to integrate the reading operation and the carrying operation. That is, when the cartridge 4 is input from outside of the library apparatus 60, since the cartridge 4 can be gripped from the cell 72 to perform the reading process for the bar-code label 10 and the moving process to the arbitrary cell 72 in one process, the process can be simplified and accelerated.

Since the bar-code reading apparatus 2 is installed within the height of the hand unit 6 in this configuration, as compared to the conventional configuration where the bar-code reader is installed on the top portion of the hand unit, the moving range of the hand unit 6 can be extended to the upper side and the cells can be additionally installed by that extension to increase the storage capacity for the cartridges 4 in the library apparatus 60, or the library apparatus 60 can be miniaturized with the same storage capacity.

In the relationship between the moving range of the hand unit 6 and the cells 72 in the library apparatus 60, since the bar-code reading apparatus 2 is built into the hand unit 6, as shown in FIG. 14A, the hand unit 6 can be moved up to the ceiling surface of the casing unit 62. Although a height Δh exists between the bar-code detection position of the bar-code reader 108 and the position of the grippers 110, 112 in the conventional library apparatus 100 as shown in FIG. 14B, since the hand unit 6 shown in FIG. 14A does not have such a height Δh, the moving range of the hand unit 6 is extended and the number of the installed cells 72 is increased in the casing unit 62. In the conventional library apparatus 100, a space 164 must be ensured for the movement of the bar-code reader 108 to insert/remove the cartridge 102 into/from an uppermost cell 116, and the space 164 is a useless space and prevents the miniaturization of the casing unit 162. Therefore, in the library apparatus 60 of the present invention, when the number of the installed cells 72 is the same, the height of the casing unit 62 can be reduced to achieve the miniaturization of the library apparatus 60.

Other Embodiments

Although the cartridge 4 is exemplified as the carried object in the above embodiments, the carried object may be any carried object attached with the bar-code label 10 and the present invention is not limited to the cartridge 4.

The present invention relates to the bar-code reading apparatus that reads the bar-code label attached to the carried object such as the magnetic tape cartridge, can read the bar-code while the carried object is gripped for the carrying or while the carried object is ready to be gripped, and is useful because the present invention can achieve the simplification of the bar-code reading and the carriage, the extension of the moving range of the carried object, the miniaturization of the library apparatus, etc.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A bar-code reading apparatus, comprising;
   a bar-code reading unit being movably built into a hand frame unit of a hand unit that grips a carried object where a bar-code is attached, and moving within a surface opposite to the carried object to read the bar-code of the carried object; and
   a scanning mechanism unit, provided in the hand frame unit of the hand unit, that moves the bar-code reading unit in parallel along the bar-code of the carried object to allow the bar-code reading unit to scan, and
   wherein when the hand unit is positioned to the carried object, the bar-code reading unit moves within the surface opposite to the carried object to scan the bar-code of the carried object, and reads the bar-code from the carried object.

2. The bar-code reading apparatus of claim 1, wherein a light emitting unit and a light receiving unit of the bar-code reading unit are located within the hand frame unit of the hand unit and provided at a front surface opposite to the carried object.

3. The bar-code reading apparatus of claim 1, wherein the bar-code reading unit includes a point light source and a light receiving unit that generates an output signal representing the bar-code by emitting light from the point light source to the bar-code and by receiving reflected light from the bar-code.

4. The bar-code reading apparatus of claim 1, wherein the scanning mechanism unit has a screw shaft installed rotatably in the hand unit, and by rotating the screw shaft with a motor, the scanning mechanism unit makes the bar-code reading unit perform scanning in parallel along the bar-code.

5. The bar-code reading apparatus of claim 1, wherein when the hand unit grips the carried object or just before the hand unit grips the carried object, a light emitting unit of the bar-code reading unit is operated to receive the reflected light from the bar-code.

6. The bar-code reading apparatus of claim 1, wherein reading the bar-code is simultaneously performed along with gripping and carrying the carried object.

7. The bar-code reading apparatus of claim 1, wherein the hand unit includes a gripper that grips the carried object, and the bar-code reading unit is built into the hand frame unit within upper and lower surfaces of the hand unit and within width of the gripper.

8. A bar-code reading method comprising:
   gripping a carried object where a bar-code is attached with a hand unit;
   moving the bar-code reading unit, which is movably built into a hand frame unit of the hand unit, in parallel along the bar-code of the carried object within a surface opposite to the carried object by a scanning mechanism unit to allow the bar-code reading unit to scan;
   performing scanning of the bar-code reading unit in parallel along the bar-code attached to the carried object by moving the bar-code reading unit, and emitting light to the bar-code; and
   detecting reflected light acquired from the bar-code to acquire detection information of the bar-code from the bar-code reading unit, and
   wherein when the hand unit is positioned to the carried object, the bar-code is read from the carried object gripped by the hand unit or the carried object.

9. The bar-code reading method of claim 8, further comprising:
   scanning the bar-code with the emitted light; and
   detecting the reflected light from the bar-code correspondingly to the scanning of the light.

10. The bar-code reading method of claim 8, wherein the carried object is a magnetic tape cartridge with a barcode label attached.

11. A library apparatus storing cartridges where a bar-code is attached, comprising:
    a carrying unit that carries the cartridge;
    a bar-code reading unit that is movably built into a hand frame unit of a hand unit which is installed to the carrying unit and grips the cartridge, and moves within a surface opposite to the cartridge to read the bar-code of the cartridge; and
    a scanning mechanism unit, provided in the hand frame unit of the hand unit, that moves the bar-code reading unit in parallel along the bar-code of the cartridge to allow the bar-code reading unit to scan, and wherein when the hand unit is positioned to the cartridge, the bar-code reading unit moves within the surface opposite to the cartridge to scan the bar-code of the cartridge and reads the bar-code from the cartridge.

12. The library apparatus of claim 11, wherein a light emitting unit and a light receiving unit of the bar-code reading unit are located within the hand frame unit of the hand unit and provided at a front surface opposite to the cartridge.

13. The library apparatus of claim 11, wherein the bar-code reading unit includes a point light source and a light receiving unit that generates an output signal representing the bar-code by emitting light from the point light source to the bar-code and by receiving reflected light from the bar-code.

14. The library apparatus of claim 11, further comprising a scanning mechanism unit that makes the bar-code reading unit perform scanning parallel to the bar-code by installing a screw shaft rotatably in the hand unit and by rotating the screw shaft with a motor.

15. The library apparatus of claim 11, wherein when the hand unit grips the cartridge, a light emitting unit of the bar-code reading unit is operated to receive reflected light from the bar-code.

16. An apparatus for scanning a bar code with a bar code surface on an object, comprising:
  a unit that grips the object having the bar code with the bar code surface, said unit comprising:
  a bar code reader that faces the surface, is built into the unit, and reads the code with the surface; and
  a moving mechanism within the unit moving the reader along a direction of the surface to scan the code,
  wherein when the unit is positioned to the object, the reader moves to scan the code of the object and reads the code from the object.

* * * * *